United States Patent
Lee

(10) Patent No.: US 9,668,288 B2
(45) Date of Patent: May 30, 2017

(54) METHOD OF HANDLING DEVICE-TO-DEVICE OPERATION AND RELATED COMMUNICATION DEVICE

(71) Applicant: ACER INCORPORATED, New Taipei (TW)

(72) Inventor: Chien-Min Lee, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 84 days.

(21) Appl. No.: 14/656,663

(22) Filed: Mar. 12, 2015

(65) Prior Publication Data

US 2015/0271862 A1   Sep. 24, 2015

Related U.S. Application Data

(60) Provisional application No. 61/955,765, filed on Mar. 19, 2014.

(51) Int. Cl.
| | | |
|---|---|---|
| *G01R 31/08* | (2006.01) |
| *H04W 76/02* | (2009.01) |
| *H04L 1/18* | (2006.01) |
| *H04L 5/14* | (2006.01) |
| *H04W 72/12* | (2009.01) |

(52) U.S. Cl.
CPC ......... *H04W 76/023* (2013.01); *H04L 1/1812* (2013.01); *H04L 1/1854* (2013.01); *H04L 5/14* (2013.01); *H04L 5/1469* (2013.01); *H04L 1/1887* (2013.01); *H04W 72/12* (2013.01)

(58) Field of Classification Search
CPC ............... H04W 76/023; H04W 72/12; H04W 74/0858; H04L 1/1854; H04L 5/14; H04L 5/1469; H04L 1/1812; H04L 1/1887
See application file for complete search history.

(56) References Cited

U.S. PATENT DOCUMENTS

| | | | |
|---|---|---|---|
| 2012/0028672 A1* | 2/2012 | Chen | H04W 52/241 455/522 |
| 2012/0307755 A1 | 12/2012 | Kim | |
| 2013/0170387 A1* | 7/2013 | Wang | H04W 4/005 370/252 |

(Continued)

FOREIGN PATENT DOCUMENTS

| | | |
|---|---|---|
| EP | 2 833 691 A1 | 2/2015 |
| WO | 2013143440 A1 | 10/2013 |

(Continued)

OTHER PUBLICATIONS

CATT, Multiplexing between cellular link and D2D link, 3GPP TSG RAN WG1 Meeting #75, R1-135093, Nov. 11-15, 2013, San Francisco, USA.

*Primary Examiner* — Robert Wilson
(74) *Attorney, Agent, or Firm* — Winston Hsu; Scott Margo

(57) ABSTRACT

A method of handling a device-to-device (D2D) operation for a communication device comprises determining a first subframe for performing a device-to-cellular (D2C) operation to a network, performing the D2C operation in the first subframe when the D2C operation does not collide with a D2D operation, and performing the D2C operation in the first subframe and stopping the D2D operation in the first subframe when the D2C operation collides with the D2D operation.

19 Claims, 14 Drawing Sheets

(56) References Cited

U.S. PATENT DOCUMENTS

| | | | |
|---|---|---|---|
| 2013/0235768 A1* | 9/2013 | Earnshaw | H04L 1/1671 370/280 |
| 2013/0242824 A1* | 9/2013 | Lee | H04L 1/1819 370/281 |
| 2013/0272169 A1* | 10/2013 | Wang | H04W 72/0446 370/280 |
| 2014/0004867 A1* | 1/2014 | Noh | H04W 76/023 455/450 |
| 2014/0016574 A1 | 1/2014 | Seo | |
| 2014/0204915 A1* | 7/2014 | Pelletier | H04B 7/0404 370/335 |
| 2014/0376489 A1 | 12/2014 | Lee | |
| 2015/0043397 A1* | 2/2015 | Hsieh | H04L 1/1812 370/280 |
| 2015/0078279 A1* | 3/2015 | Ko | H04L 1/1861 370/329 |
| 2015/0092689 A1* | 4/2015 | Ko | H04L 1/1861 370/329 |
| 2015/0098370 A1* | 4/2015 | Lee | H04L 1/1671 370/281 |
| 2015/0173048 A1* | 6/2015 | Seo | H04W 72/1247 370/329 |
| 2015/0200756 A1* | 7/2015 | Lee | H04L 5/0048 370/329 |
| 2015/0271810 A1* | 9/2015 | Sartori | H04L 5/14 370/280 |
| 2015/0271862 A1* | 9/2015 | Lee | H04W 76/023 370/278 |
| 2015/0304982 A1* | 10/2015 | Liao | H04W 64/00 455/456.2 |
| 2016/0014794 A1* | 1/2016 | Wu | H04W 72/10 370/329 |
| 2016/0037494 A1* | 2/2016 | Meng | H04L 5/0055 370/281 |
| 2016/0043853 A1* | 2/2016 | Lin | H04L 5/0055 370/280 |
| 2016/0182204 A1* | 6/2016 | Hsieh | H04L 5/0055 370/329 |

FOREIGN PATENT DOCUMENTS

| | | |
|---|---|---|
| WO | 2013151263 A1 | 10/2013 |
| WO | 2013162333 A1 | 10/2013 |
| WO | 2013165145 A1 | 11/2013 |
| WO | 2013191360 A1 | 12/2013 |

* cited by examiner

| Configuration index $I_{D2D}$ | Periodicity $T_{D2D}$ | Offset $T_{offset}$ | Window M |
|---|---|---|---|
| 0 | 2 | 0 | 2 |
| 1 | 2 | 1 | 2 |
| 2 - 6 | 5 | $I_{D2D}$ -2 | 2 |
| 7 - 11 | 5 | $I_{D2D}$ -7 | 3 |
| 12 - 16 | 5 | $I_{D2D}$ -12 | 4 |
| 17 - 26 | 10 | $I_{D2D}$ -17 | 2 |
| 27 - 36 | 10 | $I_{D2D}$ -27 | 3 |
| 37 - 46 | 10 | $I_{D2D}$ -37 | 4 |

FIG. 6

| UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | - | - | 6 | - | 4 | - | - | 6 | - | 4 |
| 2 | - | - | 8, 7, 4, 6 | - | - | - | - | 8, 7, 4, 6 | - | - |
| Example | - | - | {6}, {7} | - | - | - | - | {6}, {7} | - | - |

FIG. 12

| UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | - | - | 6 | - | 4 | - | - | 6 | - | 4 |
| 2 | - | - | 8, 7, 4, 6 | - | - | - | - | 8, 7, 4, 6 | - | - |
| Example | - | - | {6}, {7, 6} | - | - | - | - | {6}, {7, 6} | - | - |

FIG. 13

METHOD OF HANDLING DEVICE-TO-DEVICE OPERATION AND RELATED COMMUNICATION DEVICE

CROSS REFERENCE TO RELATED APPLICATIONS

This application claims the benefit of U.S. Provisional Application No. 61/955,765, filed on Mar. 19, 2014 and incorporated herein by reference.

BACKGROUND OF THE INVENTION

1. Field of the Invention

The present invention relates to a method used in a wireless communication system and related communication device, and more particularly, to a method of handling a device-to-device operation and related communication device.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint (CoMP) transmissions/reception, uplink (UL) multiple-input multiple-output (UL-MIMO), etc. For a UE and an eNB to communicate with each other in the LTE-A system, the UE and the eNB must support standards developed for the LTE-A system, such as the 3GPP Rel-10 standard or later versions.

Device-to-device (D2D) communication may be realized, after an initialization (e.g., connection establishment and/or peer discovery) is performed (e.g., assisted by an eNB). Then, a group of UEs may communicate (e.g., transmitting and/or receiving packets) with each other directly according to the D2D communication, and the eNB does not need to forward the packets transmitted between the communication devices. According to the D2D communication, the UEs may communicate with each other via UL resources (e.g., UL subframes configured by the eNB). In general, the D2D communication may also be seen as a D2D service (i.e., proximity service (ProSe)). In addition, a D2D subframe, D2D transmission, D2D communication and D2D discovery can be termed as a sidelink subframe, sidelink transmission, sidelink communication and sidelink discovery, respectively.

A UE may perform a D2D operation and a device-to-cellular (D2C) operation at the same time (e.g., in the same time interval). The situation may be that the UE is in a coverage area of a cell of the eNB, and the D2D communication and the D2C communication are both supported by the cell. However, the D2D operation may be affected by the D2C operation. For example, the UE may not know how to transmit a hybrid automatic repeat request (HARQ) feedback in a UL subframe according to a predetermined rule of the D2C communication, when the UL subframe is scheduled for the D2D operation. The problem may occur in a time-division duplexing (TDD) mode or a frequency-division duplexing (FDD) mode of the D2C communication. The problem may also occur when other transmission (e.g., UL control information and/or UL data) for the D2C communication is to be performed. The D2D operation and the D2C operation may not be performed regularly.

Thus, the collision between the D2D operation and the D2C operation is an important problem to be solved.

SUMMARY OF THE INVENTION

The present invention therefore provides a method and related communication device for handling a device-to-device operation to solve the abovementioned problem.

A method of handling a device-to-device (D2D) operation for a communication device comprises determining a first subframe for performing a device-to-cellular (D2C) operation to a network; performing the D2C operation in the first subframe, when the D2C operation does not collide with a D2D operation in the first subframe; and performing the D2C operation in the first subframe and stopping the D2D operation in the first subframe, when the D2C operation collides with the D2D operation in the first subframe.

A method of handling a hybrid automatic repeat request (HARQ) timeline of a frequency-division duplexing (FDD) mode comprises not transmitting a first set of HARQ feedbacks in a first set of subframes for responding to a first set of receptions according to a FDD rule; and transmitting a HARQ feedback in a subframe for responding to a reception according to the FDD rule and for responding to the first set of receptions.

A method of handling a hybrid automatic repeat request (HARQ) timeline of a time-division duplexing (TDD) mode comprises performing at least one reception in at least one subframe according to a first uplink/downlink (UL/DL) configuration; determining a subset of the at least one subframe, wherein the subset of the at least one subframe is at least one DL subframe according to the first UL/DL configuration and a second UL/DL configuration; and transmitting a HARQ feedback in a subframe for responding to the at least one reception in the subset of the at least one subframe according the second UL/DL configuration; wherein at least one UL subframe of the second UL/DL configuration is a subset of at least one UL subframe of the first UL/DL configuration.

A method of handling a device-to-device (D2D) operation for a communication device comprises determining a first subframe for performing a device-to-cellular (D2C) operation to a network; stopping performing the D2C operation in the first subframe, when the first subframe is not a D2D transmission subframe; and performing the D2C operation in the first subframe and stopping a D2D operation in the first subframe, when the first subframe is the D2D transmission subframe.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 6 is a table of the subframe offset, the periodicity and the window size according to an example of the present invention.

FIG. 12 is a schematic diagram of association sets of the communication device with different UL/DL configurations according to an example of the present invention.

FIG. 13 is a schematic diagram of association sets of the communication device with different UL/DL configurations according to an example of the present invention.

DETAILED DESCRIPTION

Figure 1:
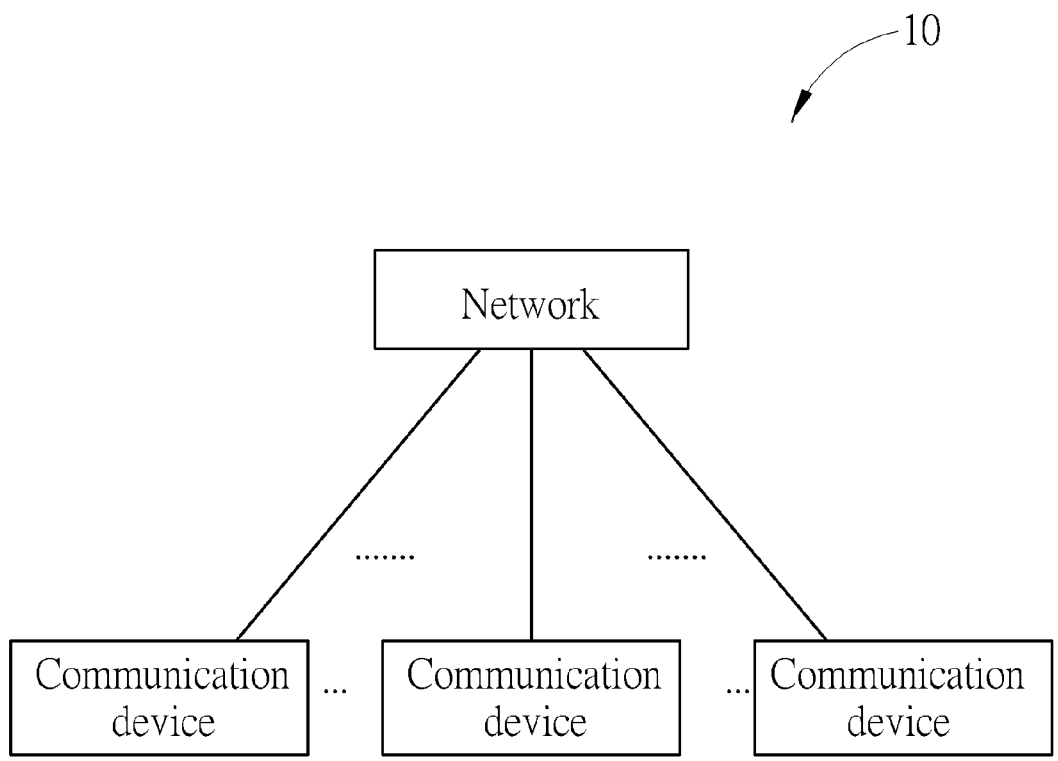
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. A communication device may communicate with the network according to a device-to-cellular (D2C) communication defined in a communication standard, e.g., the 3rd Generation Partnership Project (3GPP). Practically, the network can be a universal terrestrial radio access network (UTRAN) comprising a plurality of Node-Bs (NBs) in a universal mobile telecommunications system (UMTS). In another example, the network can be an evolved UTRAN (E-UTRAN) comprising a plurality of evolved NBs (eNBs) and/or relays in a long term evolution (LTE) system, a LTE-Advanced (LTE-A) system or an evolution of the LTE-A system.

Furthermore, the network can also include both the UTRAN/E-UTRAN and a core network, wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. In addition, the information can be processed by both the UTRAN/E-UTRAN and the core network, and the decisions are made after coordination and/or cooperation are performed by the UTRAN/E-UTRAN and the core network.

A communication device can be a user equipment (UE), a low cost device (e.g., machine type communication (MTC) device), a device-to-device (D2D) device, a mobile phone, a laptop, a tablet computer, an electronic book, a portable computer system, or combination thereof. In addition, for the D2C communication, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

In addition, two communication devices may communicate with each other directly, after an initialization (e.g., connection establishment and/or peer discovery) is performed. For example, the initialization may be assisted by the network. That is, the communication devices may communicate (e.g., transmit and/or receive signals/packets) with each other according to a D2D communication defined in a communication standard, e.g., 3GPP standard. The communication devices may communicate with each other via UL subframes determined according to frequency-division duplexing (FDD) configuration and/or time-division duplexing (TDD) configurations. The communication device may communicate with another communication device and the network simultaneously, i.e., both the D2D communication and the D2C communication are realized at the same time.

Figure 2:
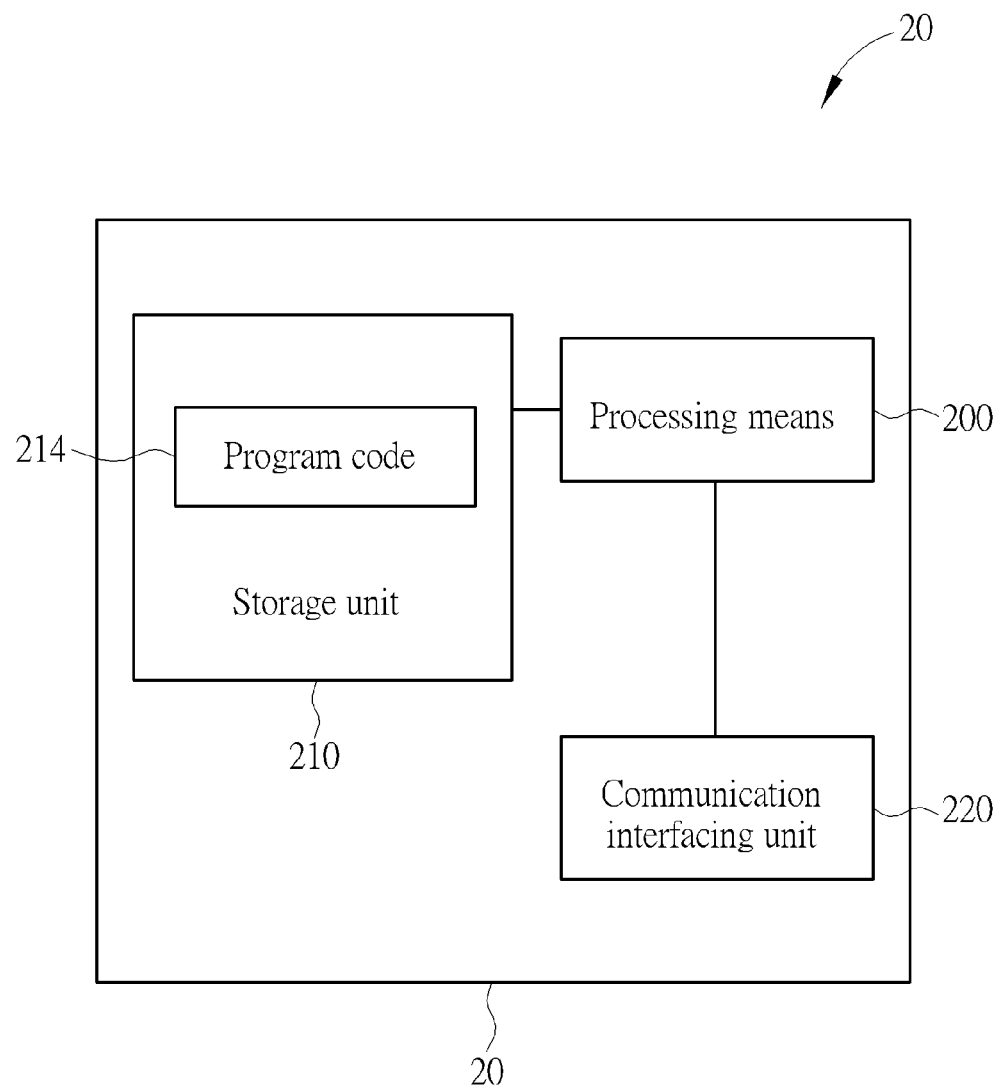
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that may store a program code 214, accessed and executed by the processing means 200. Examples of the storage unit 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage unit, non-transitory computer-readable medium (e.g., tangible media), etc. The communication interfacing unit 220 is preferably a transceiver and is used to transmit and receive signals (e.g., data, signals, messages and/or packets) according to processing results of the processing means 200.

Figure 3:
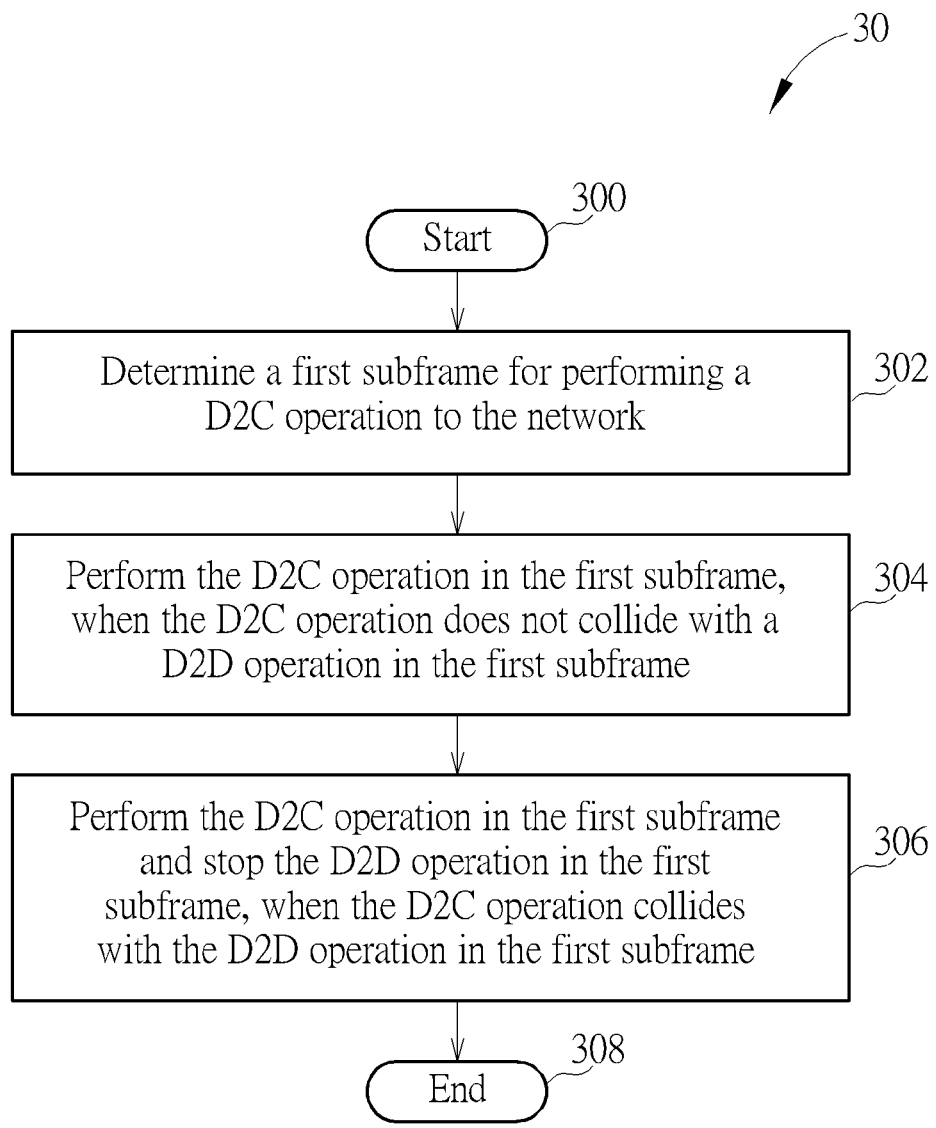
FIG. 3 is a flowchart of a process according to an example of the present invention.

FIG. 3 is a flowchart of a process 30 according to an example of the present invention. The process 30 may be utilized in a communication device for handling a D2D operation. The process 30 may be compiled into the program code 214 and includes the following steps:

Step 300: Start.

Step 302: Determine a first subframe for performing a D2C operation to the network.

Step 304: Perform the D2C operation in the first subframe, when the D2C operation does not collide with a D2D operation in the first subframe.

Step 306: Perform the D2C operation in the first subframe and stop the D2D operation in the first subframe, when the D2C operation collides with the D2D operation in the first subframe.

Step 308: End.

According to the process 30, the communication device may determine a first subframe for performing the D2C operation to the network. Then, the communication device may perform the D2C operation in the first subframe, when the D2C operation does not collide with a D2D operation in the first subframe. The first subframe may be configured by the network as a D2D subframe, e.g., for discovery, communication and/or synchronization. In addition, the communication device may perform the D2C operation in the first subframe and stop the D2D operation in the first subframe, when the D2C operation collides with the D2D operation in the first subframe. In other words, a priority of the D2C operation is higher than a priority of the D2D operation. The D2D operation may not be performed in a subframe, if the D2C operation is scheduled to be performed in the same subframe (e.g., of the same cell (e.g., the same serving cell) or different cells (e.g., different serving cells), e.g., when carrier aggregation (CA) is supported). The D2C operation may include a transmission of a hybrid automatic repeat request (HARQ) feedback and/or a physical UL shared channel (PUSCH). In one example, the HARQ feedback may be transmitted via a physical UL control channel (PUCCH). In one example, the HARQ feedback multiplied with a UL package (e.g., UL shared channel (UL-SCH)) may be transmitted via a PUSCH. The D2D operation may include a transmission of a D2D signal (e.g., package), or include a reception of a D2D signal (e.g., package). Thus, the collision between the D2D operation and the D2C operation is solved according to the above description. As a result, the D2D operation and the D2C operation can be performed regularly.

Realization of the present invention is not limited to the above description.

Definition of the collision between the D2D operation and the D2C operation in the process 30 is not limited. In one example, the D2C operation does not collide with the D2D operation in the first subframe if the D2D operation is not scheduled (e.g., by the communication device itself, by another communication device or by the network) in the first subframe, and the D2C operation collides with the D2D operation in the first subframe if the D2D operation is scheduled in the first subframe.

In one example, the communication device in the process 30 may further stop the D2D operation (e.g., retransmission) in a second subframe, when the D2C operation collides with the D2D operation in the first subframe and the second subframe is a retransmission subframe corresponding to the first subframe according to the D2D operation. That is, the communication device stops the D2D operation in both the first subframe and the second subframe, because a retransmission for the D2D operation may not be needed in the second subframe. In one example, the communication device in the process 30 may further stop the D2D operation (e.g., drop a scheduling assignment) in a third subframe, when the D2C operation collides with the D2D operation in the first subframe and the third subframe is scheduled by a scheduling assignment for the D2D operation in the first subframe. That is, the communication device stops the D2D operation in both the first subframe and the third subframe, because the D2D operation in the third subframe is triggered by the scheduling assignment in the first subframe. In one example, the communication device in the process 30 may further stop the D2D operation in a third subframe, when the D2C operation collides with the D2D operation in the first subframe, the D2C operation collides with the D2D operation in a fourth subframe, and the third subframe is scheduled by scheduling assignments for the D2D operation in the first subframe and the fourth subframe. That is, the communication device stops the D2D operation in both the first subframe, if the collisions occur in both the third subframe and the fourth subframe carrying the scheduling assignments.

Thus, the collision between the D2D operation and the D2C operation is solved according to the above description. As a result, the D2D operation and the D2C operation can be performed regularly.

Figure 4:
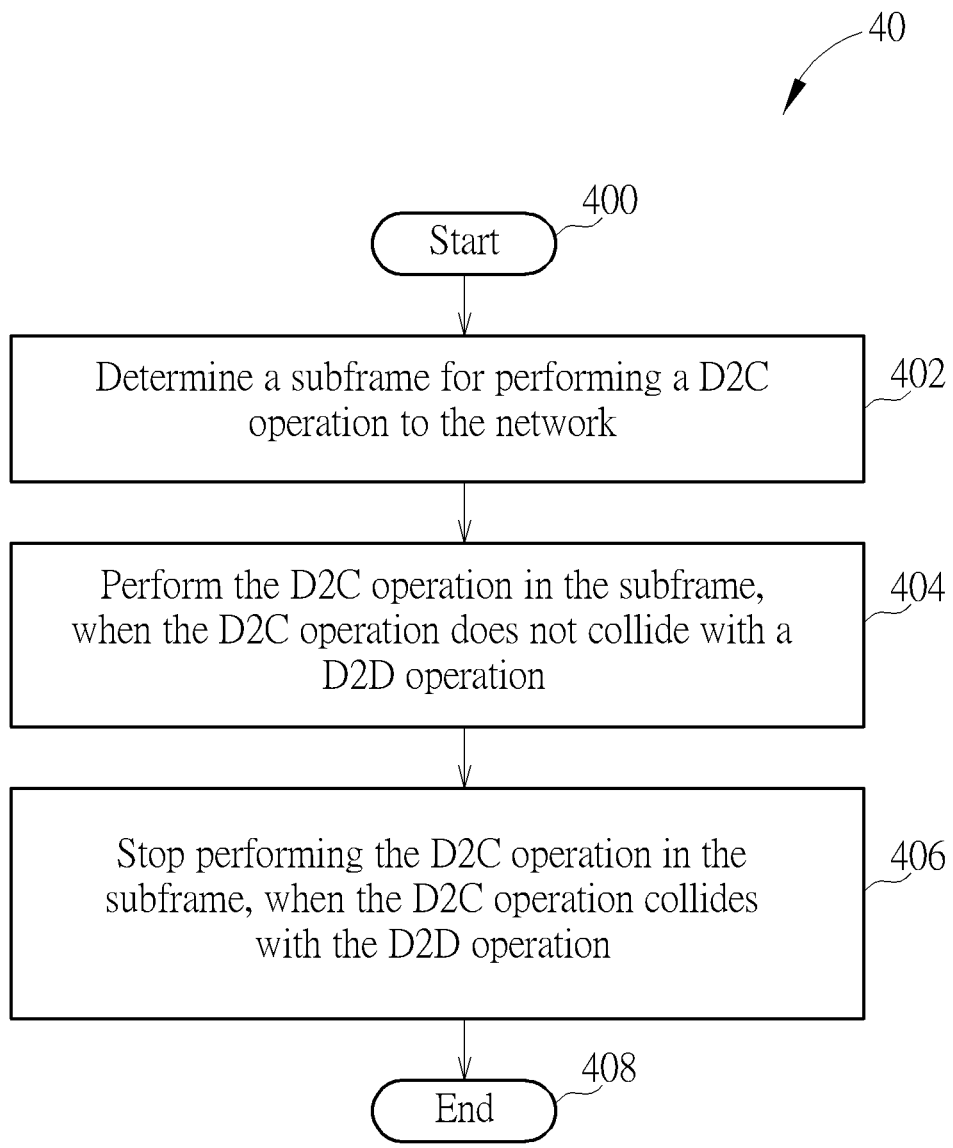
FIG. 4 is a flowchart of a process according to an example of the present invention.

FIG. 4 is a flowchart of a process 40 according to an example of the present invention. The process 40 may be utilized in a communication device for handling a D2D operation. The process 40 may be compiled into the program code 214 and includes the following steps:

Step 400: Start.

Step 402: Determine a subframe for performing a D2C operation to the network.

Step 404: Perform the D2C operation in the subframe, when the D2C operation does not collide with a D2D operation.

Step 406: Stop performing the D2C operation in the subframe, when the D2C operation collides with the D2D operation.

Step 408: End.

According to the process 40, the communication device may determine a subframe for performing a D2C operation to the network. Then, the communication device may perform the D2C operation in the subframe, when the D2C operation does not collide with a D2D operation. The subframe may be configured by the network as a D2D subframe, e.g., for discovery, communication and/or synchronization. In addition, the communication device may stop performing the D2C operation in the subframe, when the D2C operation collides with the D2D operation. In other words, a priority of the D2D operation is higher than a priority of the D2C operation. The D2C operation may not be performed in a subframe, if the D2D operation is scheduled to be performed in the same subframe. The D2C operation may include a transmission of a HARQ feedback and/or a PUSCH. In one example, the HARQ feedback may be transmitted via a PUCCH. In one example, the HARQ feedback multiplied with a UL package (e.g., UL-SCH) may be transmitted via a PUSCH. The D2D operation may include a transmission of a D2D signal (e.g., package), or include a reception of a D2D signal (e.g., package). Thus, the collision between the D2D operation and the D2C operation is solved according to the above description. As a result, the D2D operation and the D2C operation can be performed regularly.

Realization of the present invention is not limited to the above description.

Definition of the collision between the D2D operation and the D2C operation in the process 40 is not limited. In one example, the D2C operation does not collide with the D2D operation if the subframe is not a D2D subframe, and the D2C operation collides with the D2D operation if the subframe is the D2D subframe. In one example, the D2C operation does not collide with the D2D operation if the D2D operation is not scheduled in the subframe, and the D2C operation collides with the D2D operation if the D2D operation is scheduled in the subframe.

The communication device may realize the step 404 by performing the D2C operation in the subframe when the D2C operation does not collide with the D2D operation and the subframe is a transmission subframe (e.g., for D2D operation), and stopping performing the D2C operation in the subframe when the D2C operation does not collide with the D2D operation and the subframe is not the transmission subframe. That is, a transmission direction of the subframe is further taken into consideration when performing the D2C operation. Thus, the collision between the D2D operation and the D2C operation is solved according to the above description. As a result, the D2D operation and the D2C operation can be performed regularly.

Figure 5:
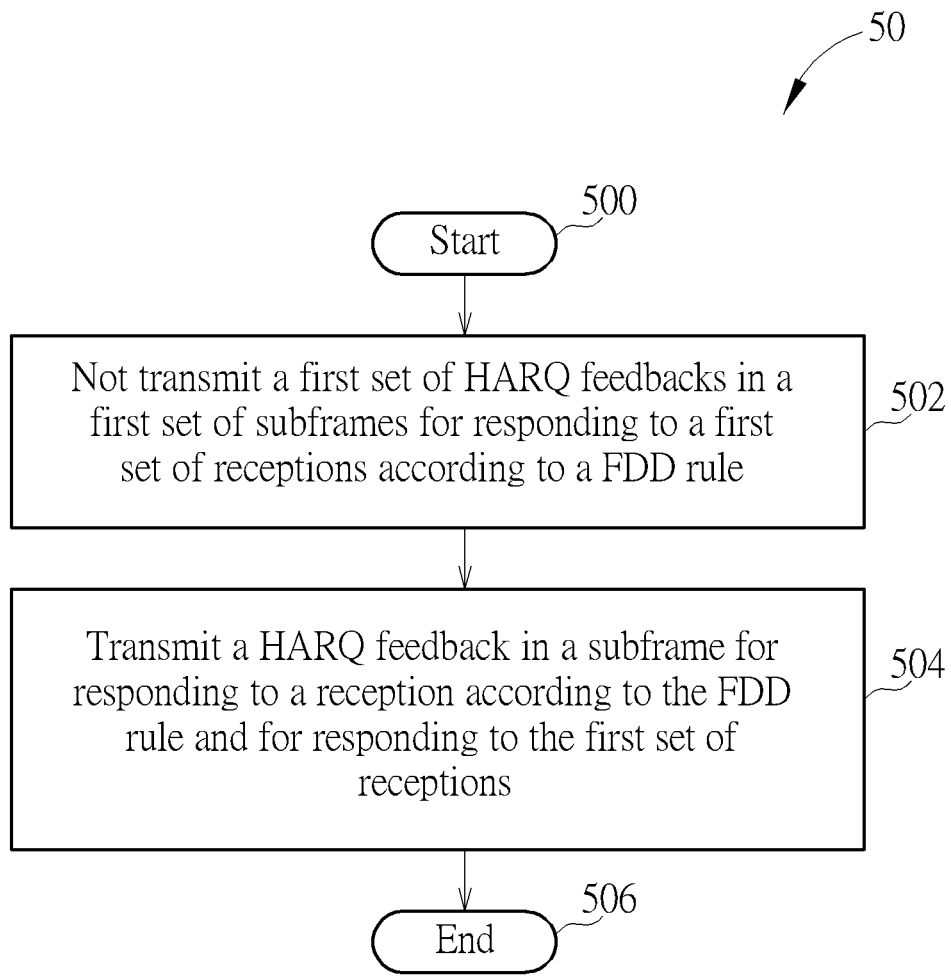
FIG. 5 is a flowchart of a process according to an example of the present invention.

FIG. 5 is a flowchart of a process 50 according to an example of the present invention. The process 50 may be utilized in a communication device for handling a HARQ timeline of a FDD mode. The process 50 may be compiled into the program code 214 and includes the following steps:

Step 500: Start.

Step 502: Not transmit a first set of HARQ feedbacks in a first set of subframes for responding to a first set of receptions according to a FDD rule.

Step 504: Transmit a HARQ feedback in a subframe for responding to a reception according to the FDD rule and for responding to the first set of receptions.

Step 506: End.

According to the process 50, the communication device may not transmit a first set of HARQ feedbacks in a first set of subframes for responding to a first set of receptions according to a FDD rule. The communication device may transmit a HARQ feedback in a subframe for responding to a reception according to the FDD rule and for responding to the first set of receptions. That is, one or more reception (s) may not be acknowledged according to the FDD rule (e.g., (n+4) rule according to the 3GPP standard), but may be acknowledged with another reception when the reception is acknowledged according to the FDD rule. Thus, the first set of subframes may be available for a D2D operation. As a result, the collision between the D2D operation and the D2C operation is solved according to the above description.

Realization of the present invention is not limited to the above description.

In one example, the communication device in the process 50 may transmit a second set of HARQ feedbacks in a second set of subframes for responding to a second set of receptions according to the FDD rule. That is, the second set of HARQ feedbacks are transmitted according to the FDD rule without being affected by the D2D operation. In one example, the communication device in the process 50 may perform at least one D2D operation in the first set of subframe. That is, the first set of subframe can be used for performing the at least one D2D operation. In one example, the first set of receptions and the reception may be consecutive receptions. Further, the first set of receptions may be performed before the reception.

In one example, the communication device may realized the step 504 as follows. The communication device determines a subframe offset with respect to a predetermined subframe for the HARQ feedback, determines a periodicity for the HARQ feedback, and determines a window size which is a sum of the HARQ feedback and a number of the first set of HARQ feedbacks. Then, the communication device transmits the HARQ feedback according to the subframe offset, the periodicity and the window size. As a result, the collision between the D2D operation and the D2C operation is solved according to the above description.

FIG. 6 is a table 60 of the subframe offset, the periodicity and the window size according to an example of the present invention. As shown in FIG. 6, a set of configuration indices $I_{D2D}$ may indicate a corresponding combination of the subframe offset $T_{offset}$, the periodicity $T_{D2D}$ and the window size M. Relations between the configuration indices $I_{D2D}$ and the corresponding parameters can be designed according to various design system requirements and design considerations. For example, the configuration indices $I_{D2D}$=12-16 (i.e., 12, 13, . . . 16) indicate the combination of the subframe offset $T_{offset}=I_{D2D}-12$, the periodicity $T_{D2D}=5$ and the window size M=4. Thus, the communication device can transmit the HARQ feedback according to the subframe offset, the periodicity and the window size.

Figure 7:
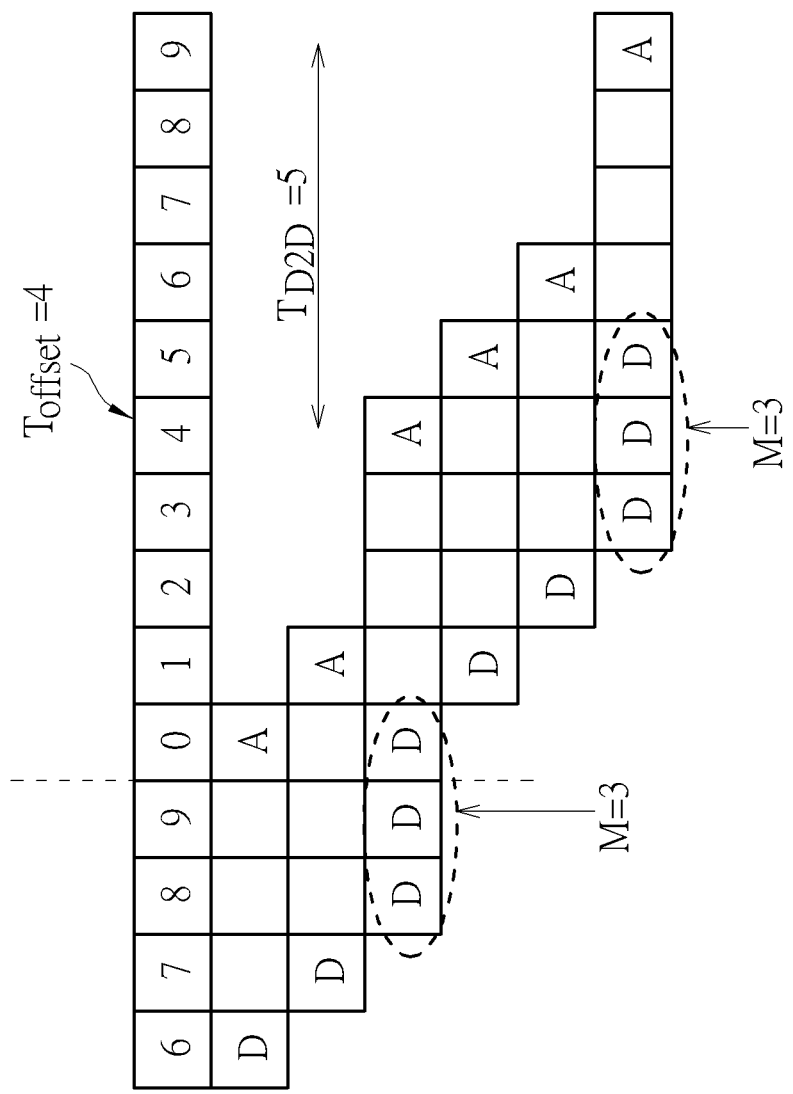
FIG. 7 is a schematic diagram of a HARQ timeline according to an example of the present invention.

FIG. 7 is a schematic diagram of a HARQ timeline according to an example of the present invention. According to the present invention, the communication device transmits the HARQ feedbacks in the subframes 0, 1, 5 and 6 according to a FDD rule (i.e., (n+4) rule), to respond to the receptions in the subframes 6, 7 of a previous frame and the subframes 1, 2 of the present frame, respectively. The communication device does not transmit the HARQ feedbacks in the subframes 2, 3, 7 and 8, and thus the receptions in the subframes 8, 9 of the previous frame and the subframes 3, 4 of the present frame are not responded according to the FDD rule. But, the communication device transmits the HARQ feedback in the subframe 4 to respond to the receptions in the subframes 8, 9 of the previous frame and the subframe 0 of the present frame, and transmits the HARQ feedback in the subframe 9 to respond to the receptions in the subframes 3, 4 and 5 of the present frame. The example shown in FIG. 7 can be realized according to the configuration indices $I_{D2D}$=8 according to which the combination of the subframe offset $T_{offset}=I_{D2D}-7$, the periodicity $T_{D2D}=5$ and the window size M=3 is indicated. In other words, various HARQ feedback timelines can be realized according to various configuration indices. Further, the table 60 can be modified to obtain different relations between the configuration indices $I_{D2D}$ and the corresponding parameters.

Figure 8:
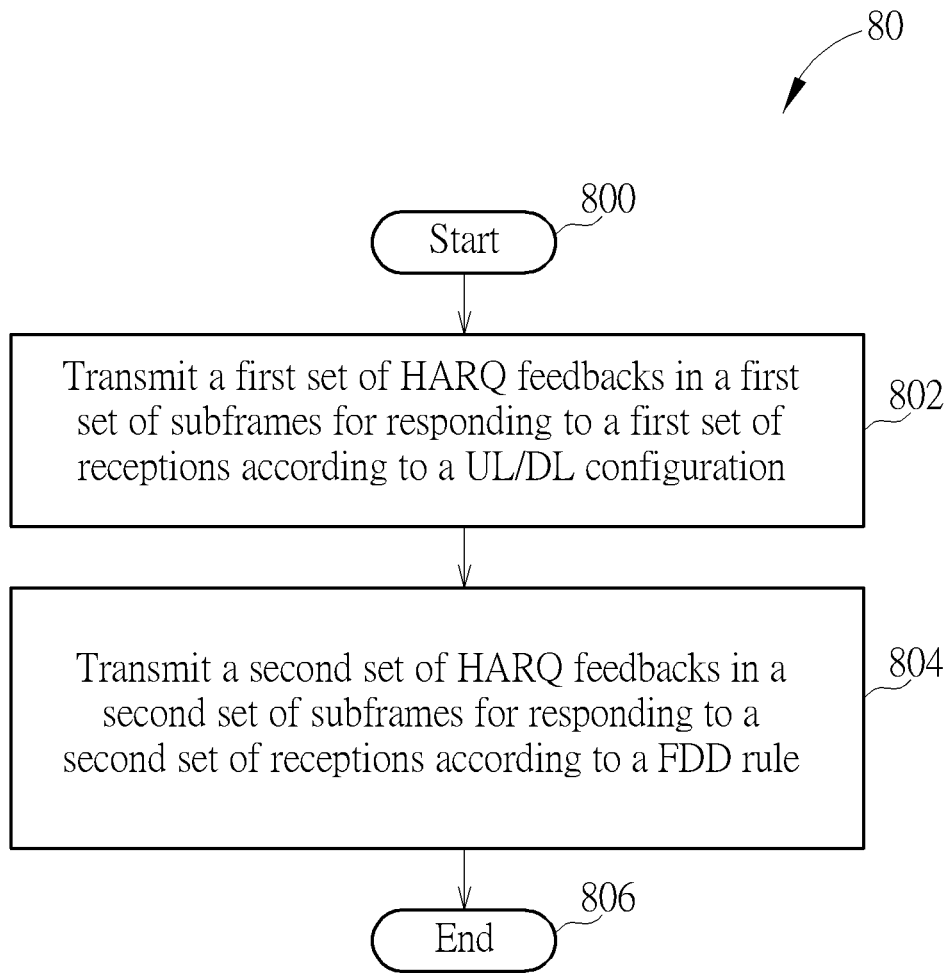
FIG. 8 is a flowchart of a process according to an example of the present invention.

FIG. 8 is a flowchart of a process 80 according to an example of the present invention. The process 80 may be utilized in a communication device for handling a HARQ timeline of a FDD mode. The process 80 may be compiled into the program code 214 and includes the following steps:

Step 800: Start.

Step 802: Transmit a first set of HARQ feedbacks in a first set of subframes for responding to a first set of receptions according to a UL/DL configuration.

Step 804: Transmit a second set of HARQ feedbacks in a second set of subframes for responding to a second set of receptions according to a FDD rule.

Step 806: End.

According to the process 80, the communication device may transmit a first set of HARQ feedbacks in a first set of subframes for responding to a first set of receptions according to a UL/DL configuration (i.e., TDD UL/DL configuration), and transmit a second set of HARQ feedbacks in a second set of subframes for responding to a second set of receptions according to a FDD rule. In other words, the first set of HARQ feedbacks is transmitted according to the UL/DL configuration, and the second set of HARQ feedbacks is transmitted according to the FDD rule. Preferably, the first set of receptions and the second set of receptions are not overlapped. That is, no HARQ feedback may be transmitted in a third set of subframes, and the third set of subframes may be saved. Thus, the communication device may perform at least one D2D operation in the third set of subframes. Thus, the collision between the D2D operation and the D2C operation is solved according to the above description. As a result, the D2D operation and the D2C operation can be performed regularly.

Realization of the present invention is not limited to the above description.

Figure 9:
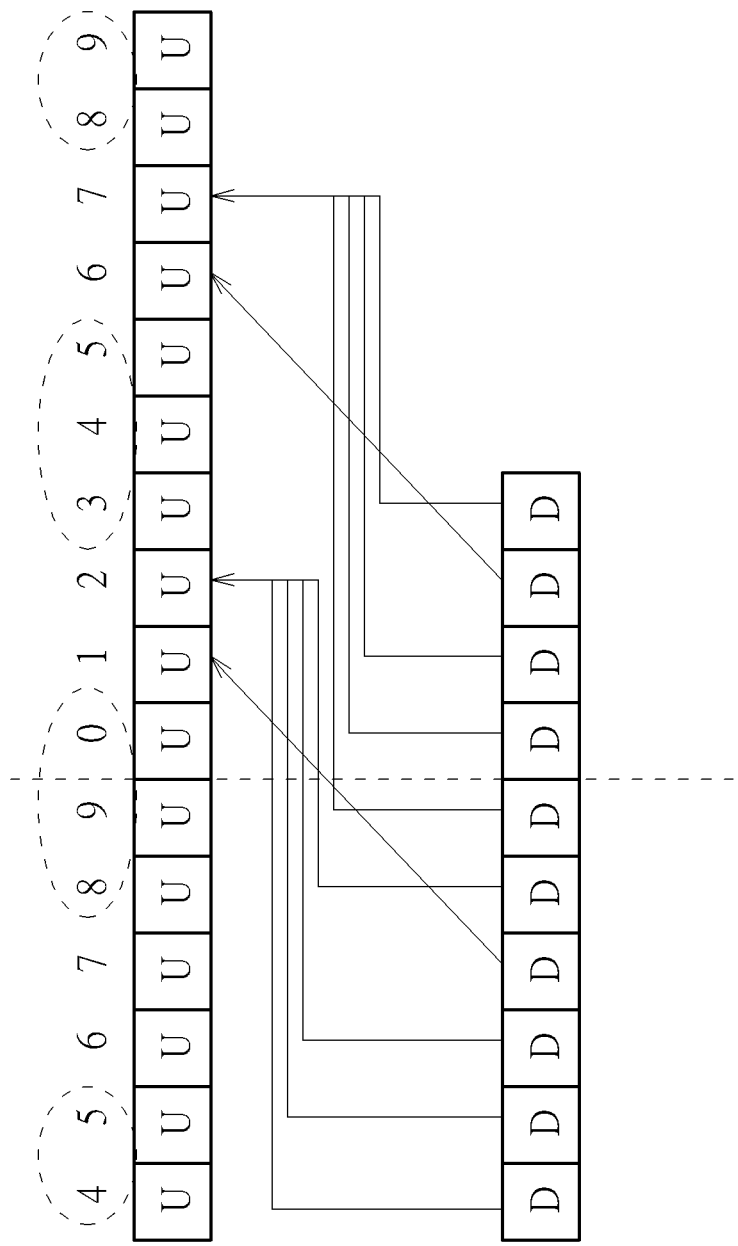
FIG. 9 is a schematic diagram of a HARQ timeline according to an example of the present invention.

FIG. 9 is a schematic diagram of a HARQ timeline according to an example of the present invention. According to the present invention, the communication device may transmit the HARQ feedbacks in the subframes 1 and 6 according to a FDD rule (e.g., (n+4) rule), to respond to the receptions in the subframe 7 of a previous frame and the subframe 2 of the present frame, respectively. In addition, according to a UL/DL configuration 2, the communication device may transmit the HARQ feedback in the subframe 2 to respond to the receptions in the subframes 4-6 and 8 of the previous frame, and may transmit the HARQ feedback in the subframe 7 to respond to the receptions in the subframe 9 of the previous frame and the subframes 0, 1, 3 of the present frame. Thus, no HARQ feedback is transmitted in the subframes 0, 3-5, 8 and 9, and one or more D2D operations may be performed in these subframes.

Figure 10:
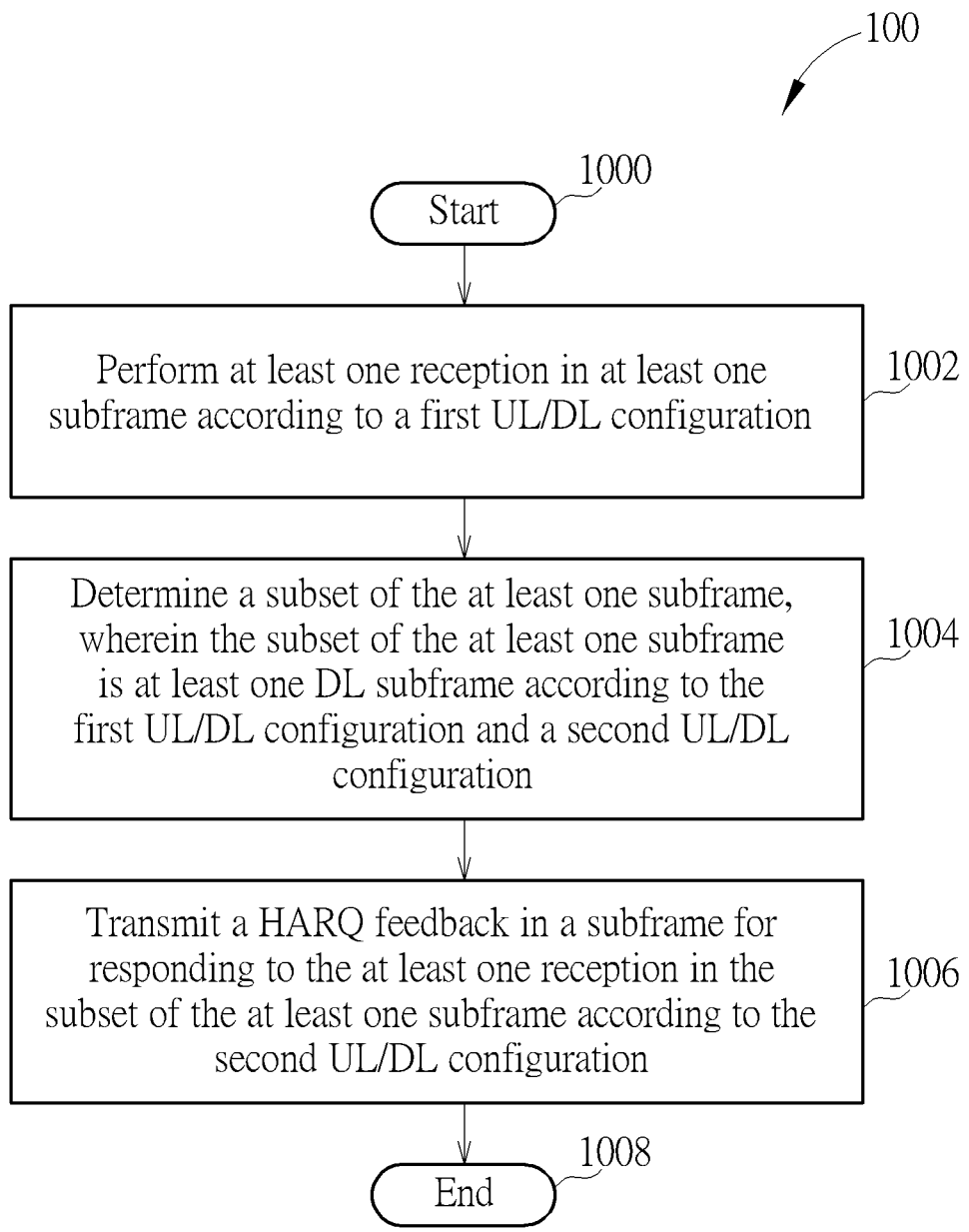
FIG. 10 is a flowchart of a process according to an example of the present invention.

FIG. 10 is a flowchart of a process 100 according to an example of the present invention. The process 100 may be utilized in a communication device for handling a HARQ timeline of a TDD mode. The process 100 may be compiled into the program code 214 and includes the following steps:

Step 1000: Start.

Step 1002: Perform at least one reception in at least one subframe according to a first UL/DL configuration.

Step 1004: Determine a subset of the at least one subframe, wherein the subset of the at least one subframe is at least one DL subframe according to the first UL/DL configuration and a second UL/DL configuration.

Step 1006: Transmit a HARQ feedback in a subframe for responding to the at least one reception in the subset of the at least one subframe according to the second UL/DL configuration.

Step 1008: End.

According to the process 100, the communication device performs at least one reception in at least one subframe according to a first UL/DL configuration. The communication device determines a subset of the at least one subframe, wherein the subset of the at least one subframe is at least one DL subframe according to the first UL/DL configuration and a second UL/DL configuration. Then, the communication device transmits a HARQ feedback in a subframe for responding to the at least one reception in the subset of the at least one subframe according to the second UL/DL configuration. That is, the UL/DL configurations for performing the reception(s) and for the HARQ feedback for responding to the reception(s) can be different. The second UL/DL configuration can be selected (e.g., determined, configured) according to system requirements and/or design considerations. In one example, the second UL/DL configuration can be selected (e.g., determined, configured) such that the communication device is not going to transmit a HARQ feedback in a D2D subframe, to avoid a conflict between a D2C operation and a D2D operation. In one example, the second UL/DL configuration can be selected (e.g., determined, configured) such that at least one UL subframe of the second UL/DL configuration is a subset of at least one UL subframe of the first UL/DL configuration. Thus, the problem that a subframe is configured for a D2D operation while the subframe is for transmitting a HARQ feedback according to the first UL/DL configuration is solved according to the process 100.

Realization of the present invention is not limited to the above description.

In one example, a first HARQ resource region for one of the at least one subframe determined according to the first UL/DL configuration and a second HARQ resource region for the one of the at least one subframe determined according to the second UL/DL configuration may be the same HARQ resource region. In another example, a first HARQ resource region for one of the at least one subframe determined according to the first UL/DL configuration does not overlap with a second HARQ resource region for the one of the at least one subframe determined according to the second UL/DL configuration.

Figure 11:
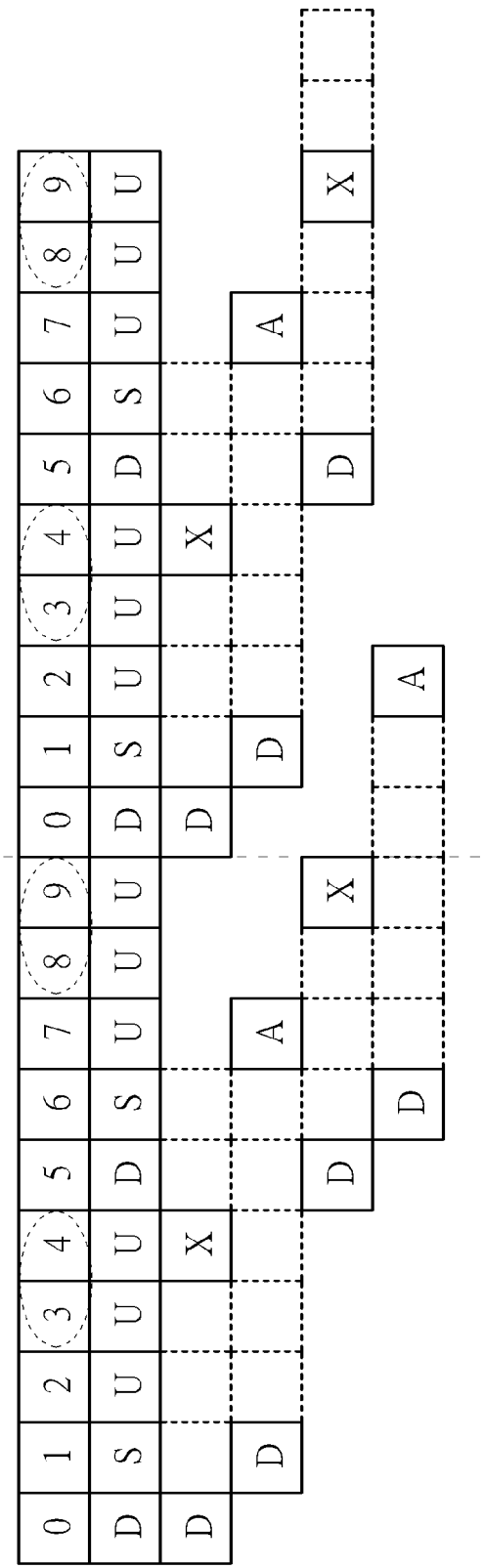
FIG. 11 is a schematic diagram of a HARQ timeline according to an example of the present invention.
Figure 11:
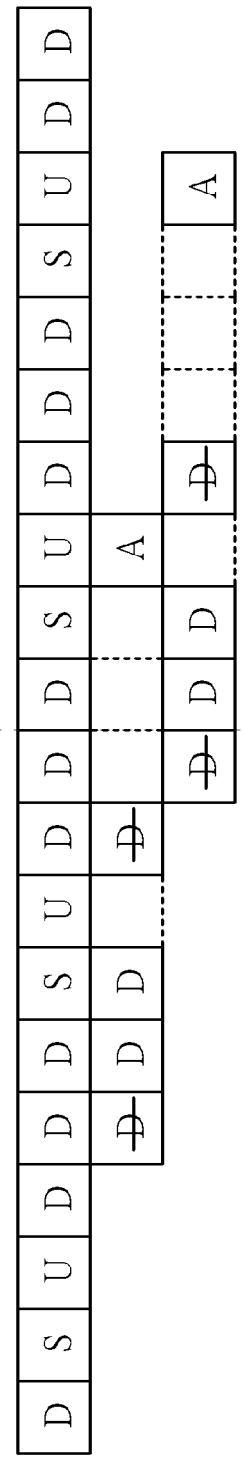

FIG. 11 is a schematic diagram of a HARQ timeline according to an example of the present invention. In FIG. 11, the communication device is configured with a UL/DL configuration 0 for determining UL/DL resources. Subframes 3, 4, 8 and 9 are configured for possible D2D operations. According to the present invention, the communication device may transmit a HARQ feedback according to a UL/DL configuration 2 (i.e., reference UL/DL configuration). That is, a different UL/DL configuration is used for transmitting the HARQ feedback, to solve the collision between the D2D operation and the D2C operation. Accordingly, the transmission of the HARQ feedback is not affected by the D2D operations, because the HARQ feedback may only be transmitted in subframes 2 and 7 which are not overlapped with the subframes 3, 4, 8 and 9. For example, the communication may transmit a HARQ feedback in the subframe 2, to respond to one or more receptions in the subframes 5 and/or 6 of a previous frame. The communication may transmit a HARQ feedback in the subframe 7, to respond to one or more receptions in the subframes 0 and/or 1 of a present frame. In contrast, according to the prior art, a reception in the subframe 0 may not be responded because the subframe 4 is configured for the D2D operation, and the communication device cannot operate regularly due to the conflict between the D2C operation and the D2D operation. In addition, even though the subframes 3, 4, 8 and 9 are included in the feedback timeline according to the UL/DL configuration 2, these subframes are actually UL subframes determined according to the UL/DL configuration 0. Thus, no reception from the network is performed in these subframes, and the communication device does not need to respond to the receptions in these subframes in the HARQ feedbacks.

FIG. 12 is a schematic diagram of association sets of the communication device with different UL/DL configurations according to an example of the present invention, wherein subframe allocations corresponding to the UL/DL configurations are shown in FIG. 11. Association sets for the UL subframes and the UL/DL configurations are shown in FIG. 12. For example, the association set of the subframe 2 which includes the association set index 6 will be used for determining HARQ resource according to the prior art, when the communication device intends to transmit a HARQ feedback in the subframe 2 to respond to a reception in a subframe 6 of a previous frame. However, the association set of the subframe 2 which includes the association set indices 6 and 7 will be used for determining HARQ resource according to the present invention, when the communication device intends to transmit a HARQ feedback in the subframe 2 to respond to reception(s) in subframes 6 and/or 5 (corresponding to the association indices 6 and 7, respectively) of the previous frame. As stated previously, the communication device does not need to respond to the receptions in the UL subframes (i.e., the subframes 4 and 8) determined according to the UL/DL configuration 0. That is, the subframes which are DL subframes according to both the UL/DL configurations 0 and 2 are acknowledged. The association index 7 is determined as independent association set because it is not included in the UL/DL configuration 0 and is provided according to the UL/DL configuration 2. In FIG. 12, considering the subframe 2, a HARQ resource region (the second HARQ resource region stated previously) for the association index 6 determined according to the present invention (e.g., the UL/DL configuration 2) is the same as a HARQ resource region (the first HARQ resource region stated previously) for the association index 6 determined according to the UL/DL configuration 0, i.e., association index 6 is reused. Another HARQ resource region (the second HARQ resource region stated previously) for the association index 7 is determined according to the UL/DL configuration 2.

FIG. 13 is a schematic diagram of association sets of the communication device with different UL/DL configurations according to an example of the present invention, wherein subframe allocations corresponding to the UL/DL configurations are shown in FIG. 11. Association sets for the UL subframes and the UL/DL configurations are shown in FIG. 13. The operations regarding the HARQ feedback in FIG. 13 are similar to those in FIG. 12, except resource regions determined according to the present invention and the UL/DL configuration 0 do not overlap. For example, considering the subframe 2, a HARQ resource region (the second HARQ resource region stated previously) for the association index 6 determined according to the present invention (e.g., the UL/DL configuration 2) does not overlap with a HARQ resource region (the first HARQ resource region stated previously) for the association index 6 determined according to the UL/DL configuration 0. The association index 7 is allocated in an independent association set (i.e., a nonoverlapped resource region) because it is not included in the UL/DL configuration 0 and is provided according to the UL/DL configuration 2. In addition, the sequence of the association set {7, 6} corresponding to the second HARQ resource region is not limited, e.g., the association set may be {6, 7}.

Figure 14:
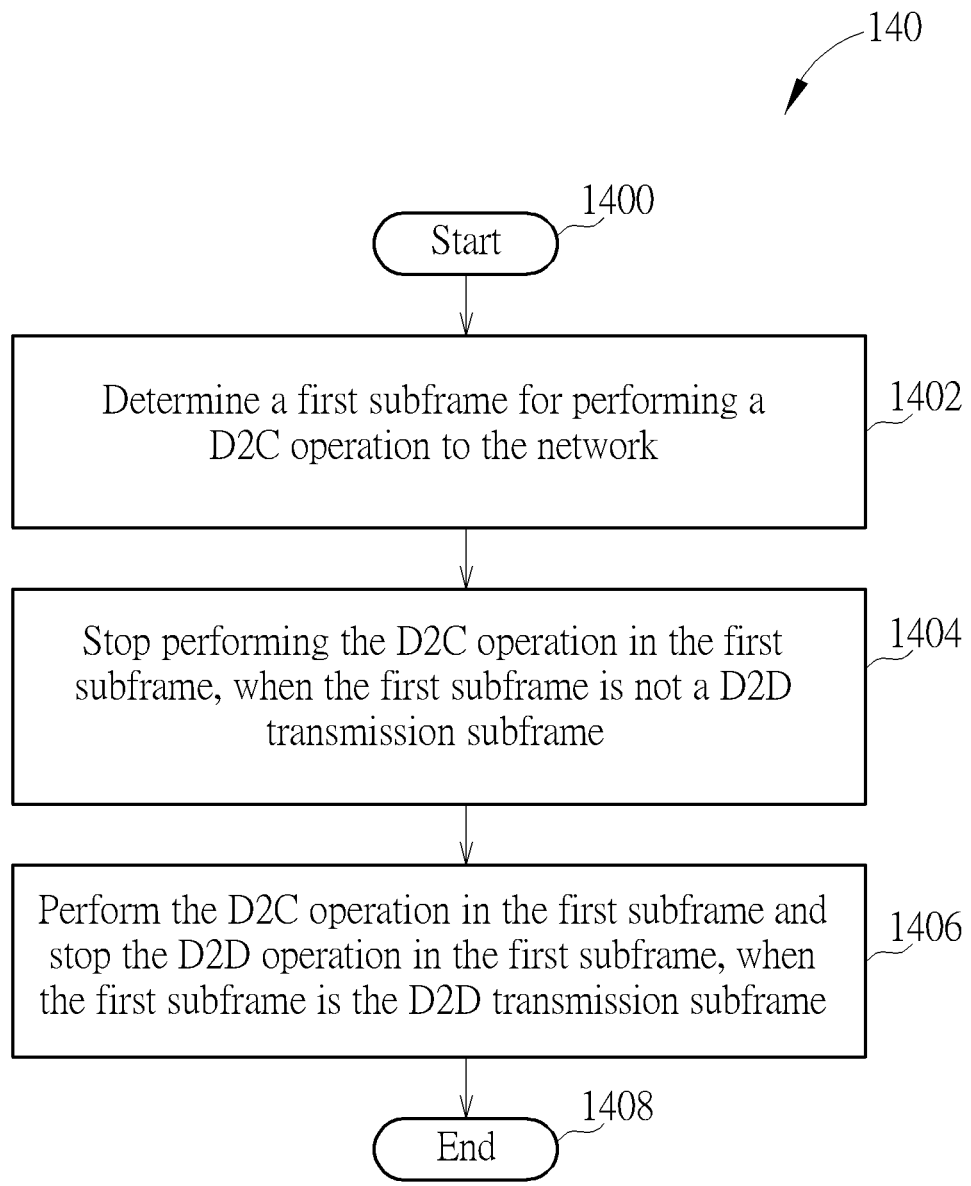
FIG. 14 is a flowchart of a process according to an example of the present invention.

FIG. 14 is a flowchart of a process 140 according to an example of the present invention. The process 140 may be utilized in a communication device for handling a D2D operation. The process 140 may be compiled into the program code 214 and includes the following steps:

Step 1400: Start.

Step 1402: Determine a first subframe for performing a D2C operation to the network.

Step 1404: Stop performing the D2C operation in the first subframe, when the first subframe is not a D2D transmission subframe.

Step 1406: Perform the D2C operation in the first subframe and stop a D2D operation in the first subframe, when the first subframe is the D2D transmission subframe.

Step 1408: End.

According to the process 140, the communication device may determine a first subframe for performing a D2C operation to the network. Then, the communication device may stop performing a D2C operation in the first subframe, when the first subframe is not a D2D transmission subframe. The first subframe may be configured by the network as a D2D transmission subframe, e.g., for discovery, communication and/or synchronization. In addition, the communication device may perform the D2C operation in the first subframe and stop the D2D operation in the first subframe, when the first subframe is the D2D transmission subframe. In other words, a priority of the D2C operation is higher than a priority of the D2D operation. The D2D operation may not be performed in a subframe, if the D2C operation is scheduled to be performed in the same subframe (e.g., of the same (e.g., serving) cell or different (e.g., serving) cells, e.g., when carrier aggregation (CA) is supported). The D2C operation may include a transmission of a HARQ feedback and/or a PUSCH. In one example, the HARQ feedback may be transmitted via a physical UL control channel (PUCCH). In one example, the HARQ feedback multiplied with a UL package (e.g., UL-SCH) may be transmitted via a PUSCH. The D2D operation may include a transmission of a D2D signal (e.g., package). Thus, the collision between the D2D operation and the D2C operation is solved according to the above description. As a result, the D2D operation and the D2C operation can be performed regularly.

Realization of the present invention is not limited to the above description.

In one example, the communication device in the process 140 may perform the D2C operation in the first subframe, when the first subframe is the D2D transmission subframe without any D2D operation. In one example, the communication device may further stop the D2D operation (e.g., retransmission) in a second subframe, when the first subframe is the D2D transmission subframe and the second subframe is a retransmission subframe corresponding to the first subframe according to the D2D operation. That is, the communication device stops the D2D operation in both the first subframe and the second subframe, because a retransmission for the D2D operation may not be needed in the second subframe. In one example, the communication device in the process 140 may further stop the D2D operation (e.g., drop a scheduling assignment) in a third subframe, when the first subframe is the D2D transmission subframe and the third subframe is scheduled by a scheduling assignment for the D2D operation in the first subframe. That is, the communication device stops the D2D operation in both the first subframe and the third subframe, because the D2D operation in the third subframe is triggered by the scheduling assignment in the first subframe. In one example, the communication device in the process 140 may further stop the D2D operation in a third subframe, when the first subframe is the D2D transmission subframe, a fourth subframe is the D2D transmission subframe (where the D2D operation is also stopped), and the third subframe is scheduled by scheduling assignments for the D2D operation in the first subframe and the fourth subframe. That is, the communication device stops the D2D operation in both the first subframe, if the collisions occur in both the third subframe and the fourth subframe carrying the scheduling assignments.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit (s) and/or mixed circuit (s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides a method of handling the D2D operation. Thus, the collision between the D2D operation and the D2C operation is solved according to the above description. As a result, the D2D operation and the D2C operation can be performed regularly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling a device-to-device (D2D) operation for a communication device, the method comprising:
   determining a first subframe for performing a device-to-cellular (D2C) operation to a network;
   performing the D2C operation in the first subframe, when the D2C operation does not collide with a D2D operation in the first subframe; and
   performing the D2C operation in the first subframe and stopping the D2D operation in the first subframe, when the D2C operation collides with the D2D operation in the first subframe;
   wherein the method further comprises:
   stopping the D2D operation in a second subframe, when the D2C operation collides with the D2D operation in the first subframe and the second subframe is a retransmission subframe corresponding to the first subframe according to the D2D operation; or
   stopping the D2D operation in a third subframe, when the D2C operation collides with the D2D operation in the first subframe and the third subframe is scheduled by a scheduling assignment for the D2D operation in the first subframe; or
   stopping the D2D operation in a third subframe, when the D2C operation collides with the D2D operation in the first subframe, the D2C operation collides with the D2D operation in a fourth subframe, and the third subframe is scheduled by scheduling assignments for the D2D operation in the first subframe and the fourth subframe.

2. The method of claim 1, wherein the D2C operation comprises a transmission of a hybrid automatic repeat request (HARD) feedback and/or a physical UL shared channel (PUSCH).

3. The method of claim 1, wherein the D2D operation comprises a transmission of a D2D signal, or comprises a reception of a D2D signal.

4. The method of claim 1, wherein the D2C operation does not collide with the D2D operation in the first subframe if the D2D operation is not scheduled in the first subframe, and the D2C operation collides with the D2D operation in the first subframe if the D2D operation is scheduled in the first subframe.

5. A method of handling a hybrid automatic repeat request (HARQ) timeline of a frequency-division duplexing (FDD) mode, the method comprising:
   not transmitting a first set of HARQ feedbacks in a first set of subframes for responding to a first set of receptions according to a FDD rule;
   determining a subframe offset with respect to a predetermined subframe for a HARQ feedback;
   determining a periodicity for the HARQ feedback;
   determining a window size which is a sum of the HARQ feedback and a number of the first set of HARQ feedbacks; and
   transmitting the HARQ feedback according to the subframe offset, the periodicity and the window size.

6. The method of claim 5, further comprising:
   transmitting a second set of HARQ feedbacks in a second set of subframes for responding to a second set of receptions according to the FDD rule.

7. The method of claim 5, further comprising:
   performing at least one device-to-device (D2D) operation in the first set of subframes.

8. The method of claim 5, wherein the first set of receptions and the reception are consecutive receptions.

9. The method of claim 8, wherein the first set of receptions is performed before the reception.

10. The method of claim 5, wherein the predetermined subframe is a subframe 0 of a system frame number (SFN) 0.

11. A method of handling a hybrid automatic repeat request (HARQ) timeline of a time-division duplexing (TDD) mode, the method comprising:
    performing at least one reception in at least one subframe according to a first uplink/downlink (UL/DL) configuration;
    determining a subset of the at least one subframe, wherein the subset of the at least one subframe is at least one DL subframe according to the first UL/DL configuration and a second UL/DL configuration; and
    transmitting a HARQ feedback in a subframe for responding to the at least one reception in the subset of the at least one subframe according the second UL/DL configuration;
    wherein at least one UL subframe of the second UL/DL configuration is a subset of at least one UL subframe of the first UL/DL configuration.

12. The method of claim 11, wherein a first HARQ resource region for one of the at least one subframe determined according to the first UL/DL configuration and a second HARQ resource region for the one of the at least one subframe determined according to the second UL/DL configuration are the same HARQ resource region.

13. The method of claim 11, wherein a first HARQ resource region for one of the at least one subframe determined according to the first UL/DL configuration does not overlap with a second HARQ resource region for the one of the at least one subframe determined according to the second UL/DL configuration.

14. A method of handling a device-to-device (D2D) operation for a communication device, the method comprising:
   determining a first D2D subframe for performing a device-to-cellular (D2C) operation to a network;
   stopping performing the D2C operation in the first D2D subframe, when the first D2D subframe is not a D2D transmission subframe; and
   performing the D2C operation in the first D2D subframe and stopping a D2D operation in the first D2D subframe, when the first D2D subframe is the D2D transmission subframe.

15. The method of claim 14, further comprising:
   performing the D2C operation in the first D2D subframe, when the first D2D subframe is the D2D transmission subframe without any D2D operation.

16. The method of claim 14, wherein the D2C operation comprises a transmission of a hybrid automatic repeat request (HARQ) feedback and/or a physical UL shared channel (PUSCH).

17. The method of claim 14, further comprising:
   stopping the D2D operation in a second D2D subframe, when the first D2D subframe is the D2D transmission subframe and the second D2D subframe is a retransmission subframe corresponding to the first D2D subframe according to the D2D operation.

18. The method of claim 14, further comprising:
   stopping the D2D operation in a third D2D subframe, when the first D2D subframe is the D2D transmission subframe and the third D2D subframe is scheduled by a scheduling assignment for the D2D operation in the first D2D subframe.

19. The method of claim 14, further comprising:
   stopping the D2D operation in a third D2D subframe, when the first D2D subframe is the D2D transmission subframe, a fourth D2D subframe is the D2D transmission subframe, and the third D2D subframe is scheduled by scheduling assignments for the D2D operation in the first D2D subframe and the fourth D2D subframe.

* * * * *